UNITED STATES PATENT OFFICE.

PETER C. DOREMUS, OF BAYONNE, NEW JERSEY.

PROCESS AND COMPOUND FOR EMBALMING AND PRESERVING ANIMAL SUBSTANCES.

SPECIFICATION forming part of Letters Patent No. 228,519, dated June 8, 1880.

Application filed October 17, 1879.

*To all whom it may concern:*

Be it known that I, PETER C. DOREMUS, of Bayonne, in the county of Hudson and State of New Jersey, have invented a new and useful Improvement in Preserving Animal Substances, which invention is fully set forth in the following specification.

This invention relates to a compound and to a process for preserving animal flesh or tissues, and also for preserving or embalming dead bodies.

In the preparation of my compound I use saltpeter, sulphurous-acid gas, and water. These ingredients may be combined in various proportions, according to the nature of the flesh or body to be preserved; but for general purposes I have found the following proportions to answer well in practice, viz: To every ten gallons of water I use one pound of saltpeter and one pound of sulphur, and the method of combining the ingredients is to dissolve the saltpeter in the water, then to burn the sulphur, thereby producing sulphurous-acid gas, and to treat the solution with this gas by passing the gas through it.

When this compound is to be used for preserving meat, the latter is simply steeped therein for a period of about four hours, so that the meat is thoroughly impregnated with the compound.

In the preservation of dead bodies I remove the brains and intestines from the body and fill the cavities with cotton or other absorbent material which is saturated with the compound. I then close the cavities thus filled by sewing or other suitable means, and next subject the body to the action of sulphurous-acid gas for a period of about ten hours by placing the body in a casement or vessel nearly air-tight and introducing the gas thereto in a suitable manner. I then steep the body in the compound by submerging and leaving the same therein about twenty-four hours. The body is then removed and the process is complete. In some cases about one-half pound of alum may be added to the ingredients of my compound for the purpose of hardening and cleansing; but as these qualities are present in the alum no special claim is made thereto.

What I claim as new, and desire to secure by Letters Patent, is—

1. A compound for preserving animal flesh or tissues, consisting of saltpeter, sulphurous-acid gas, and water, combined substantially in the manner set forth.

2. The process of preserving or embalming dead bodies, consisting in removing the brains and intestines and filling the cavities with cotton or other absorbent material saturated with a compound of saltpeter, sulphurous-acid gas, and water, then closing the cavities and subjecting the body to the action of sulphurous-acid gas, and finally steeping the body in the said compound, substantially as described.

In testimony that I claim the foregoing I have hereunto set my hand and seal this 3d day of October, 1879.

P. C. DOREMUS. [L. S.]

Witnesses:
    CHAS. WAHLERS,
    W. C. HAUFF.